United States Patent [19]

Bradbury

[11] Patent Number: 5,134,889
[45] Date of Patent: Aug. 4, 1992

[54] MECHANICAL TRANSDUCER

[76] Inventor: Farel Bradbury, 1 Worcester Street, Monmouth, Gwent NP5 3DF, United Kingdom

[21] Appl. No.: 634,184
[22] PCT Filed: Jul. 17, 1989
[86] PCT No.: PCT/GB89/00821
    § 371 Date: Jan. 11, 1991
    § 102(e) Date: Jan. 11, 1991
[87] PCT Pub. No.: WO90/00734
    PCT Pub. Date: Jan. 25, 1990

[30] Foreign Application Priority Data

Jul. 15, 1988 [GB] United Kingdom ............... 8816833

[51] Int. Cl.$^5$ ............................................. G01L 7/08
[52] U.S. Cl. .......................................... 73/731; 92/90; 200/83 B
[58] Field of Search ................ 73/146.8, 731, 715; 92/92, 90, 40; 411/59, 61, 38, 37; 200/83 B, 83 S

[56] References Cited

U.S. PATENT DOCUMENTS 3,479,081  11/1969  Schaaf ................... 411/38
4,123,640  10/1978  Ballantyne ............. 411/38

Primary Examiner—Donald O. Woodiel
Attorney, Agent, or Firm—Edwin D. Schindler

[57] ABSTRACT

A mechanical transducer is disclosed which includes a converter having a plurality of elongate flexible elements, which are joined together at their opposite ends and spaced at intervals around a longitudinal axis of the transducer. The opposite ends of the converter are displaceable toward and away from each other along the axis, which displacement is accompanied by a bowing or straightening of the elongate elements. Thus, an axial force applied to the converter will be converted to a radial force exerted by the elongate elements, or a radial force applied to the elongate elements will be converted to an axial force.

13 Claims, 1 Drawing Sheet

MECHANICAL TRANSDUCER

BACKGROUND OF THE INVENTION

This invention relates to a mechanical transducer which responds to a force which is applied to it in one direction to exert a force of a different magnitude in another direction.

It is a common requirement to control a large force by means of a small force, for example a motor car is brought to rest using a relatively light force applied to a foot brake pedal. It is also a common requirement to take a weak signal and generate sufficient force to operate signalling devices, for example a vane in an air duct can sense very slight air movements yet because of its size it can exert a sufficient force to operate a control switch e.g. in boilers and air conditioning apparatus. However, the necessary control in these examples requires amplifying systems of considerable size and complexity or, in the case of the air valve, lead to possible disturbances from vibration, overshoot or undershoot or time delay if significantly damped. If pistons and similar devices are used as buffers, dampers or actuators, the force-to-thrust ratio is determined by the bore size of the device: in order to contain or to generate large forces the area, and hence the diameter, has to be increased unless unacceptably high pressures are used. However, the increase in bore size, which increases the sensitivity to lower pressures, also results in a considerable increase in the inertia of the axially displaceable piston or cylinder, and this can impair the response and reaction of the apparatus to external shock and vibration forces. For example, a pressure switch (which comprises an electric switch operated by a pressure-sensitive actuator) may use a large circular diaphragm to generate a sufficient force from a low pressure on its surface to overcome the trip force on the switch (which may be a microswitch). This device has the disadvantage that the plane in which the diaphragm lies is perpendicular to the axis of displacement needed to operate the switch and therefore the volume required for the device is large. Also the mass of the diaphragm and other moving parts makes the device vulnerable to axial vibration and therefore to spurious operation.

SUMMARY OF THE INVENTION

It is an object of this invention to provide a mechanical transducer which is able to overcome the problems noted above.

In accordance with this invention, there is provided a mechanical transducer, comprising a converter which comprises a plurality of elongate flexible elements joined together at their opposite ends and spaced at intervals around a longitudinal axis of the transducer, the opposite ends of the converter being displaceable towards and away from each other along said axis, which displacement is accompanied by a bowing or straightening of said elements, so that an axial force applied to said converter is converted to a radial force exerted by said elements, or a radial force applied to said elements is converted to an axial force.

It will be appreciated that the converter takes the general form of a rib cage. An axial force applied between the ends of the rib cage may be a pushing force or a pulling force, to cause the elements or ribs to bow radially outwards or radially inwards, or to straighten. The change in the volume enclosed by the rib cage is substantially greater than the volume displaced by the axially moving ends of the rib cage. A force applied to the ribs radially inwardly or outwardly, produces a substantially amplified axial force at the ends of the rib cage. This force amplification is particularly large as the ribs are deflected towards or away from their straight positions.

Preferably the converter or rib cage is provided at its ends with means for applying or delivering an axial or torsional force. The opposite ends of the rib cage may be linked, in order to apply or deliver the axial or torsional force, either around the outside of the rib cage or through the rib cage or both.

A resilient element may be disposed around the outside or within the rib cage or integrally therewith, and may serve to apply or absorb forces acting on the rib cage. This resilient element may comprise a membrane or pellicle the resilience or elasticity of which resists the deflection of the ribs and so absorbs the energy of axial forces applied externally to the rib cage. The membrane may instead be non-elastic, or may be plastic and tend to retain its new shape after deflection, or if elastic it need not exert any elastic force on the rib cage.

The membrane may form a seal between the inside and outside of the rib cage. Fluid pressure may then be applied to the inside or to the outside of the rib cage either to produce or to absorb an axial force applied between the ends of the rib cage. The membrane may comprise a tubular membrane appropriately closed or sealed at its ends.

A stop may be provided within the rib cage or outside the rib cage, to limit the inward or outward radial displacement of the ribs and/or to limit the axial displacement of the ends of the rib cage. In this manner, the stop(s) may prevent the ribs straightening too much, or going beyond straight (i.e. bowing in the opposite sense) or bowing too much.

The rib cage may be formed from one piece of sheet material or as a one-piece moulding. Instead the ribs may comprise separate members linked or pivoted at their ends to end members of the rib cage.

The rib cage may be generally cylindrical in shape, or of any other appropriate cross-section (e.g. hexagonal), and its sides may be parallel, conical, double conical, stepped or of any other profile.

If in the normal condition of the rib cage the ribs are bowed outwardly, the ribs may be wider at their middles than at their ends so as to reduce the gaps between adjacent ribs. The individual ribs may in general be of any appropriate shape or cross section. The ribs may be constructed so that their own frictional or elastic characteristics modify or apply forces to the transducer.

BRIEF DESCRIPTION OF THE DRAWING FIGURES

An embodiment of this invention will now be described by way of example only and with reference to the accompanying drawings, in which.

DETAILED DESCRIPTION OF THE DRAWING FIGURES

Figure 1:
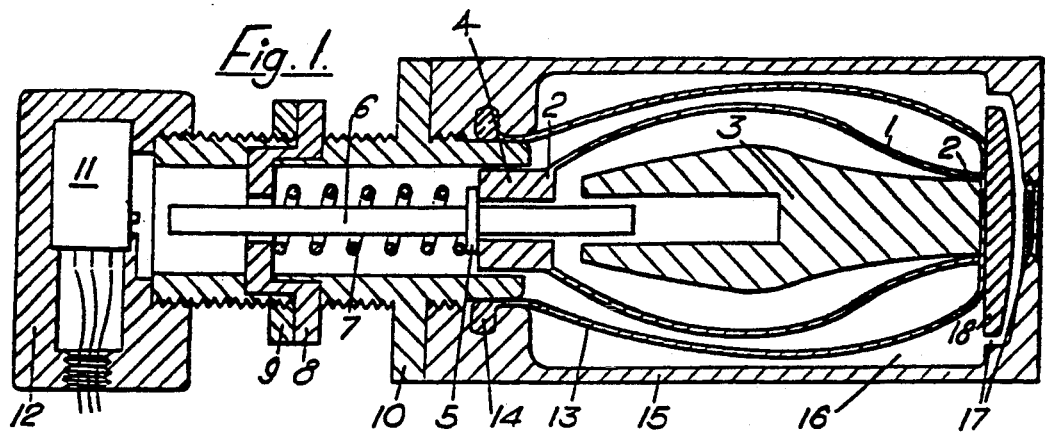
FIG. 1 is a longitudinal section through a transducer in accordance with this invention; showing the transducer in a rest condition.

Referring to FIG. 1 of the drawings, there is shown a mechanical transducer in which fluid pressure acts radially on a converter to produce an axial displacement of a push rod which actuates a microswitch. The transducer comprises a housing 15 having an internal chamber 16. The converter 1, 2 is disposed within the chamber 16 and is in the form of a rib cage having a plurality of elongate elements 1 spaced at intervals around a longitudinal axis of the transducer, the opposite ends of the elements or ribs being joined together at 2, 2. One end of the rib cage is fixed to or abuts one end 18 of the housing, whilst the other end of the rib cage is formed as a thrust washer 4 receiving a push rod 6, a collar 5 on which abuts the thrust washer 4. A tubular membrane or pellicle 13 surrounds the rib cage and has one end closed or sealed to the end 18 of the housing, and is sealed to the housing at its other end by a peripheral beading 14 on the membrane being received in a groove in an aperture through the other end of the housing. This aperture is threaded and receives a threaded tube 10. A housing 12, which contains a microswitch 11, is screwed onto the outer end of the tube 10. The push rod 6 extends along the axis of the tube 10 and a compression spring 7 encircles the push rod 6 and acts between the collar 5 on the push rod 6 and a stop member, shown diagrammatically at 8, to apply an axial biasing force to the rib cage, causing its ribs 1 to bow radially outwardly as shown in FIG. 1. The position of the stop member 8 along the tube 10 can be adjusted to preset the bias force of the spring 7, and the stop member 8 can be locked in position by means of a lock nut 9. An arbor or profiled stop 3 extends along the axis of the transducer from the end 18 of the housing, to limit the radially-inwards displacement of the ribs 1 of the rib cage. The housing is provided at one end with a port and with ducts 17 leading from this port to the interior of the chamber 16.

Figure 2:
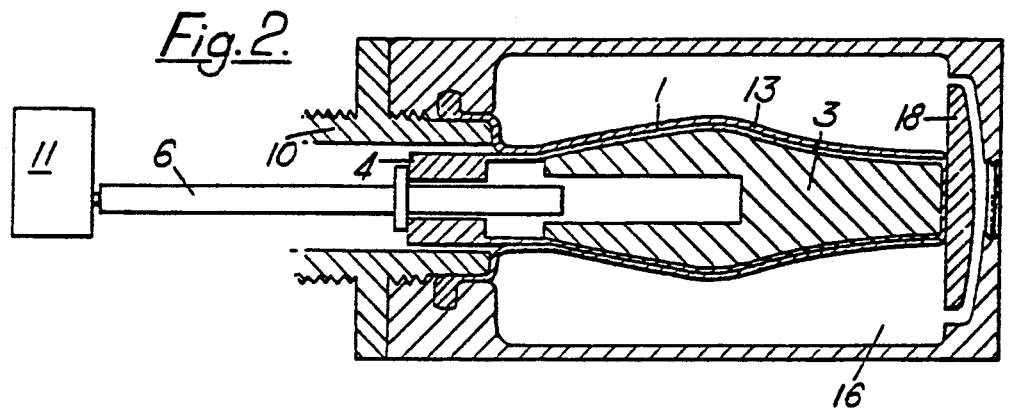
FIG. 2 is a section similar to FIG. 1, showing the transducer when receiving an applied pressure.
Figure 3:
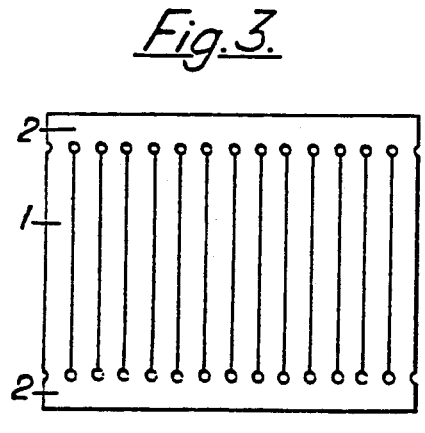
FIG. 3 is a plan view of a blank of sheet material from which a rib cage of the transducer is formed.

In use of the transducer shown in FIG. 1, the port 17 is connected to receive a fluid medium the pressure of which is to be monitored. The pressure of this medium within the chamber 16 acts radially inwards towards the axis of the transducer, whilst the interior of the membrane 13 is at atmospheric pressure. The pressure from the medium within the chamber 16 acts through the membrane 13 on the ribs 1 of the rib cage to displace these ribs radially inwards: this has the effect of displacing the thrust washer 4 axially outwards and displacing the push rod 6 along the axis against the bias of the compression spring 7. When the pressure of the medium within the chamber 16 reaches a predetermined value, the push rod will be displaced sufficiently, against the bias of spring 7, to contact and depress the actuator button of the microswitch 11: this condition is shown in FIG. 2, in which also the ribs 1 are pressed against the profiled surface of the stop or arbor 3 to limit further radially-inward displacement of these ribs. When the pressure of the medium within chamber 16 falls again, the spring 7 displaces the thrust washer 4 along the axis of the transducer in the return direction and the ribs bow radially outwardly again: also, the microswitch 11 resets itself.

The fluid pressure at which the microswitch is actuated can be adjusted by adjusting the position of the stop member 8. Further adjustment is provided for by screwing the tube 10 relative to the housing 12 so as to adjust its penetration into the housing 12.

Figures 4, 5, 6:
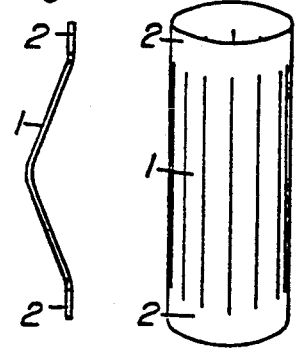
FIG. 4 is a section through the rib cage shown in flexed condition.
FIG. 5 shows the rib cage when formed from the blank of FIG. 3, in its unflexed condition.
FIG. 6 shows the rib cage in its flexed condition.
Figure 7:
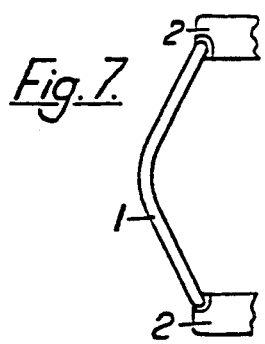
FIG. 7 is a section through an alternative rib cage, which is assembled from individual rib members.
Figure 8:
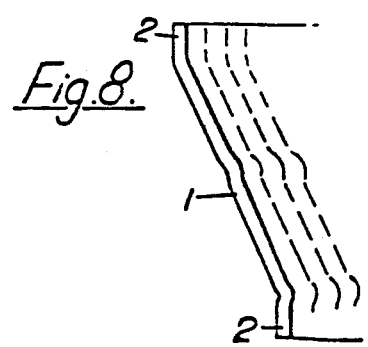
FIG. 8 is a section through a rib cage of generally conical shape.

Referring to FIGS. 3 to 6, the rib cage may be formed from a sheet of resiliently flexible material which is cut with a series of parallel slits to provide the plurality of elongate ribs 1 joined together at their opposite ends by margins 2 of the sheet. The sheet is then wrapped into tubular form as shown in FIG. 5. The ribs 1 will bow outwards, as shown in FIGS. 4 and 6, by applying an axial force to displace the opposite ends of the rib cage towards each other. Whilst the rib cage shown in FIGS. 1 to 6 is cylindrical in its rest condition, it may instead by conical in shape (FIG. 8) or of any other tubular shape. Instead of being a one-piece member, the rib cage may comprise a number of resiliency flexible elongate members 1 fixed at their opposite ends to end members 2 (FIG. 7). In all of these constructions, the elongate elements 1 may be flexible (or made up of links pivoted together) but not resilient: in the example shown in FIGS. 1 and 2 the spring 7 biasses the rib cage to a condition in which its ribs are bowed outwardly. In an alternative construction, the medium the pressure of which is to be monitored by being introduced into the interior of the tubular membrane 15 so as to urge the ribs radially outwardly from the configuration shown in FIG. 2 and produce an axial displacement to actuate a microswitch: in this case the spring 7 may act in the opposite direction or the membrane 13 may be resilient and serve to bias the ribs 1 radially inwardly. It will be appreciated that the transducer may be used as a fluid pump if an axial drive is applied between the ends of the rib cage.

Preferably in the transducer according to the invention, the ribs are flimsy and not themselves individually able to withstand the stresses to which they would be subjected if the membrane were absent. However, the membrane (whether provided outside or within or integrally with the ribs) ensures a stable support and distributed loading of the ribs.

In accordance with further features of the invention, the membrane 13 may be permeable or apertured to allow fluid flow between the interior and exterior volumes of the rib cage at a predetermined rate.

Preferably the stop 3 prevents the ribs 1 from completely straightening out, so that the ribs 1 always follow a sinuously curved or flexed profile.

The rib cage may include at least one further set of ribs spaced apart around the axis of the device and concentric with the set of ribs 1 which are shown.

In the or each set of ribs, the ribs need not be equally spaced from each other nor equally spaced from the axis. The rib cage need not extend for a full 360° around the axis.

The or each rib cage can be divided into two or more groups of ribs, able to displace independently of each other. Particularly in this case, a torsional force may be applied to one end of the rib cage (turning about an axis intersecting the longitudinal axis at right angles), so that ribs to one side of the longitudinal axis are bowed further and the ribs to the other side of the longitudinal axis are bowed less. Alternatively, differential radial forces may be applied to the ribs to deliver a torsional force at the end or ends of the rib cage.

Whilst the transducer which is shown has been described as operating an electric switch, it may operate any other form of sensor, or it may operate a control device (e.g. a valve or clamp).

I claim:

1. A mechanical force-amplifying transducer, comprising:

a force-amplifying converter having a longitudinal axis;

a plurality of elongate flexible elements each having a first end and a second end, said elongate flexible elements being spaced at intervals around said longitudinal axis of said force-amplifying converter and lying in respective planes which include said longitudinal axis, said elongate flexible elements further having their said first ends joined together and their said second ends joined together, with opposite ends of said force-amplifying converter being reciprocally displaceable towards and away from each other along said longitudinal axis, said reciprocal displacement being accompanied by a reciprocal bowing or straightening of said elongate flexible elements, but with said elongate flexible elements remaining substantially in their said respective planes;

force-applying means;

force-output means with either said force-applying means or said force-output means being coupled to the opposite ends of said force-amplifying converter with said means not being coupled to said force-amplifying converter being coupled to all of said elongate elements collectively, whereby said force-amplifying converter converts an axially-applied force to an amplified radial force exerted collectively by said elongate flexible elements on the force-output means or converts a radially-applied force to an amplified axial force exerted by said elongate flexible elements on said force-output means.

2. The mechanical force-amplifying transducer as claimed in claim 1, further comprising a stop to limit the displacement of said elongate flexible elements.

3. The mechanical force-amplifying transducer as claimed in claim 1, wherein said elongate flexible elements is a first set of elongate flexible elements and said force-amplifying converter comprises at least one additional set of said elongate flexible elements spaced at intervals around said longitudinal axis of said force-amplifying converter and concentric with said first set of elongate flexible elements.

4. The mechanical force-amplifying transducer as claimed in claim 1, wherein said force-amplifying converter includes a membrane which separates an interior volume contained within said force-amplifying converter from an external volume surrounding force-amplifying converter.

5. The mechanical force-amplifying transducer as claimed in claim 4, wherein said membrane is permeable to allow fluid into or out of the interior volume of said force-amplifying converter.

6. The mechanical force-amplifying transducer as claimed in claim 1, further comprising a housing having a sealed interior wherein said force-amplifying converter is disposed, said housing having at least one port for a fluid to communicate with the sealed interior of said housing around said force-amplifying converter.

7. The mechanical force-amplifying transducer as claimed in claim 1, further comprising a housing having a sealed interior wherein said force-amplifying converter is disposed, said housing having at least one port for a fluid to communicate with the sealed interior of said housing within said force-amplifying converter.

8. The mechanical force-amplifying transducer as claimed in claim 1, arranged to produce an axial thrust for operating a sensor or a control device.

9. The mechanical force-amplifying transducer as claimed in claim 1, wherein each of said elongate flexible elements comprises a one-piece element of flexible material.

10. The mechanical force-amplifying transducer as claimed in claim 1, wherein said force-amplifying converter comprises a one-piece member formed to provide the plurality of elongate flexible elements.

11. The mechanical force-amplifying transducer as claimed in claim 1, wherein each of said elongate flexible elements comprises a plurality of links joined together.

12. The mechanical force-amplifying transducer as claimed in claim 1, wherein said force-amplifying converter is arranged to receive an axial thrust for generating an amplified volume displacement.

13. The mechanical force-amplifying transducer as claimed in claim 1, wherein said elongate flexible elements are resiliently flexible.

* * * * *